(12) United States Patent
Medles et al.

(10) Patent No.: US 8,934,365 B2
(45) Date of Patent: Jan. 13, 2015

(54) USER EQUIPMENT AND METHOD FOR RADIO LINK MONITORING

(75) Inventors: Abdelkader Medles, Royston (GB); Cyril Valadon, Letchworth Garden City (GB)

(73) Assignees: MStar Semiconductor, Inc. (TW); MStar Semiconductor, Inc., Grand Cayman (KY); MStar France SAS, Issy les Moulineaux (FR); MStar Software R&D (Shenzhen) Ltd., Shenzhen (CN)

( * ) Notice: Subject to any disclaimer, the term of this patent is extended or adjusted under 35 U.S.C. 154(b) by 271 days.

(21) Appl. No.: 13/542,050

(22) Filed: Jul. 5, 2012

(65) Prior Publication Data

US 2013/0308472 A1 Nov. 21, 2013

(30) Foreign Application Priority Data

May 15, 2012 (EP) .................................... 12167981

(51) Int. Cl.
*H04J 1/16* (2006.01)
*H04J 3/14* (2006.01)
*H04L 1/00* (2006.01)
*H04L 12/56* (2006.01)

(52) U.S. Cl.
USPC ........................................................ 370/252

(58) Field of Classification Search
None
See application file for complete search history.

(56) References Cited

U.S. PATENT DOCUMENTS

| | | | |
|---|---|---|---|
| 2004/0184398 A1* | 9/2004 | Walton et al. | 370/203 |
| 2006/0159160 A1* | 7/2006 | Kim et al. | 375/148 |
| 2009/0290632 A1* | 11/2009 | Wegener | 375/240 |
| 2010/0118856 A1* | 5/2010 | Krishnamurthy et al. | 370/342 |
| 2010/0296567 A1* | 11/2010 | Qiu et al. | 375/227 |
| 2010/0303139 A1* | 12/2010 | Arthaber | 375/224 |
| 2011/0002278 A1* | 1/2011 | Lindoff et al. | 370/329 |
| 2011/0107174 A1* | 5/2011 | Liu et al. | 714/752 |
| 2011/0255467 A1* | 10/2011 | Larsson | 370/328 |
| 2011/0256861 A1* | 10/2011 | Yoo et al. | 455/423 |
| 2011/0280209 A1* | 11/2011 | Wegener | 370/329 |

* cited by examiner

*Primary Examiner* — Hassan Phillips
*Assistant Examiner* — Prenell Jones
(74) *Attorney, Agent, or Firm* — Edell, Shapiro & Finnan, LLC (57) ABSTRACT

Techniques are provided for a radio link quality monitoring method and apparatus wherein a given user equipment device receives a plurality of Orthogonal Frequency Division Multiplex symbols that comprise a plurality of resource elements distributed in time and frequency, and which include reference symbols. The objective of the radio link quality monitoring is to predict the user equipment detection probability of control messages transmitted by the base station. The radio link quality estimation process calculates two average signal to noise ratio values over the complete frequency bandwidth for two assumed control channel formats corresponding to in-sync and out-of-sync conditions. The results of the calculations are then used to deduce the average error probabilities that are compared with predefined thresholds to provide the in-sync/out-of-sync indications.

12 Claims, 5 Drawing Sheets

USER EQUIPMENT AND METHOD FOR RADIO LINK MONITORING

FIELD OF THE INVENTION

The present disclosure relates to wireless communication devices and more particularly to techniques aimed at reducing the complexity of the processing required for the estimation of the downlink radio link quality of the serving cell.

BACKGROUND OF THE INVENTION

The $3^{rd}$ Generation Partnership Project (3GPP) developed the standards used by Long Term Evolution (LTE) cellular communication systems. LTE is a standard for wireless data communications technology that has evolved from the GSM/UMTS standards. The goal of LTE is to increase the capacity and speed of wireless data networks using new Digital Signal Processing (DSP) techniques and modulation schemes that were developed in the past decade. The LTE wireless interface is incompatible with second generation (2G) and third generation (3G) networks, and operates via a separate wireless spectrum.

In LTE the purpose of the Radio Link Monitoring (RLM) function implemented in the mobile subscriber's user equipment (UE) is to monitor the downlink radio link quality of the serving cell in RRC_CONNECTED state and is based on cell specific reference signals (RSs). This in turn enables the UE, when in the RRC_CONNECTED state, to determine whether it is in-sync or out-of-sync with respect to its serving cell.

After a certain number of consecutive out-of-sync indications, the UE starts a network configured radio link failure timer. The timer is stopped if a number of consecutive in-sync indications are reported by the UE's physical layer. Both the out-of-sync and in-sync timers are configurable by the network. If the out-of-sync timer expires, Radio Link Failure (RLF) is declared. The UE turns off its transmitter to avoid interference and save power, and is also required to re-establish the RRC connection within a certain time.

Control information is provided by the base-station to the UE through the Physical Downlink Control Channel (PDCCH). The PDCCH can be used by the base-station to indicate to the UE that information needs to be received in the downlink. This channel can also be used to send uplink grant messages to signal to the UE that it is allowed to transmit. More generally, the PDCCH is used by the base station to convey scheduling decisions to the UE and hence correct reception and decoding by the UE of the associated control messages is critical to the correct operation of the network. The criteria for indicating out-of-sync and in-sync conditions are therefore based on whether the UE can reliably decode the PDCCH or not.

A number of different formats can be used for the transmission of the control information messages on the PDCCH in order to adapt to variations in the quality of the transmission link between the base-station and the UE. These different formats correspond to different levels of error correction redundancy and hence have different signal to noise ratio (SNR) requirements. An out-of-sync indication will be generated when a hypothetical PDCCH transmitted with a format using a high level of redundancy cannot be received reliably by the UE. On the other hand, if the UE estimates that it can correctly receive control messages transmitted on the PDCCH with a format using a low level of error correction redundancy, an in-sync indication will be generated. Hence, the generation of in-sync and out-of-sync indications requires the UE to estimate the Block Error Rate (BLER) for these two hypothetical formats.

The existing BLER estimation solutions are based on calculating the effective SNR over the complete bandwidth on a per subcarrier basis. The SNR is generated from the channel estimation process performed on the Reference Signals (RSs) transmitted by the base station. The ensemble of SNRs per subcarrier are mapped to an overall effective SNR using estimation methods such as mean mutual information per bit (MMIB) or exponential effective SNR mapping (EESM). This effective SNR is then used to estimate the BLER, based on the BLER versus SNR mapping function for the assumed PDCCH transport format (see for example 3GPP R4-081998 and 3GPP R4-082302).

The operating points for the detection of out-of-sync and in-sync correspond to cases of very low signal-to-noise conditions that are very challenging for channel estimation and the high noise level in the received signal has a major impact on the accuracy of the calculated SNR per subcarrier. The channel estimation noise in these cases is high and adds to the average channel power leading to a bias in the calculated SNR. The channel estimation noise and the resulting channel power bias make the effective SNR highly unreliable when the number of available measurements is limited, for example when Discontinuous Reception (DRX) is used or in Time Division Duplex (TDD) mode when the number of downlink subframes is small. The invention described herein provides techniques which improve the accuracy of the SNR estimation process and reduce the complexity of the radio link monitoring processing.

SUMMARY OF THE INVENTION

Techniques are provided herein, for a radio link quality monitoring method and apparatus wherein a given UE device receives a plurality of Orthogonal Frequency Division Multiplex (OFDM) symbols that comprise a plurality of Resource Elements (RE) distributed in time and frequency, and which include known reference symbols. The objective of the radio link quality monitoring is to predict the UE detection probability of control information messages that can be transmitted by the base station (BS).

Techniques are provided for the generation by the UE of propagation channel estimates using the known reference symbols. The propagation channel estimates are generated for each RE and correspond to the different links between the multiple BS transmit antennas and the UE receive antennas. The UE also uses the reference symbols to estimate the noise power for each RE at each receive antenna. The channel estimates are then combined across multiple REs in order to generate a single channel power estimate for each of the propagation links. Similarly a single noise power estimate per receive antenna is generated.

The UE removes the bias from the channel power estimate by taking into account the noise rejection provided by the channel estimation process. The unbiased channel power estimates and the noise power estimates are then used by the UE to estimate the SNR that would be experienced at the output of the demodulator for each configuration in a set of two control information message formats.

The BLER, based on the estimated SNR value, is calculated by the UE using the BLER versus SNR characteristics of the control channel demodulator in the absence of channel estimation errors for each of the two control information message formats. The UE then averages the BLER for the two assumed control channel formats by combining the BLER instances calculated for each of the formats over defined averaging periods.

The averaged BLER for the two assumed control channel formats are then compared with optimised thresholds to provide out-of-sync and in-sync indications that are then passed to higher layers. The threshold used for the detection of out-of-sync is nominally set for a BLER of higher than 10%, while the threshold used for in-sync detection is nominally set for a BLER of lower than 2%.

According to one further aspect of the invention, different channel estimation processes are applied, on the one hand, to the channel estimates used for channel and noise power estimation and, on the other hand, for demodulation of the received signal. The SNR estimation is then adapted to reflect the difference in the noise rejection provided for the two different channel estimation processes. In the case of the use of multiple transmit antennas, the channel power estimation, and the calculation of the SNR at the output of the demodulator, can be adapted for use in different space/time encoding and demodulation techniques.

According to one further aspect of the invention, different numbers of samples of the channel and noise power estimates can be used, after decimation, for radio link quality monitoring. The selection of the channel estimation samples used for radio link monitoring can be made to vary with the bandwidth of the signal received by the UE. The accuracy of the SNR estimation performed for radio link monitoring depends on the quality of the channel estimation samples which are used. Hence, according to one further aspect of the invention, the number of channel estimation samples used for radio link monitoring is made dependant on the noise rejection achieved by the channel estimation process.

The ultimate problems to be solved are to address the low quality of the SNR estimates, as well as the impact of the high channel estimation errors at the demodulator. The SNR estimation is addressed by averaging the channel and noise power estimates over essentially the entire frequency bandwidth and removing the bias introduced by the noise from the channel power estimate. The impact of the high channel estimation errors at the demodulator is taken into account in the calculation of the SNR at the output of the demodulator using knowledge of the noise rejection of the channel estimation process

DESCRIPTION OF EXAMPLE EMBODIMENTS

Figure 1:
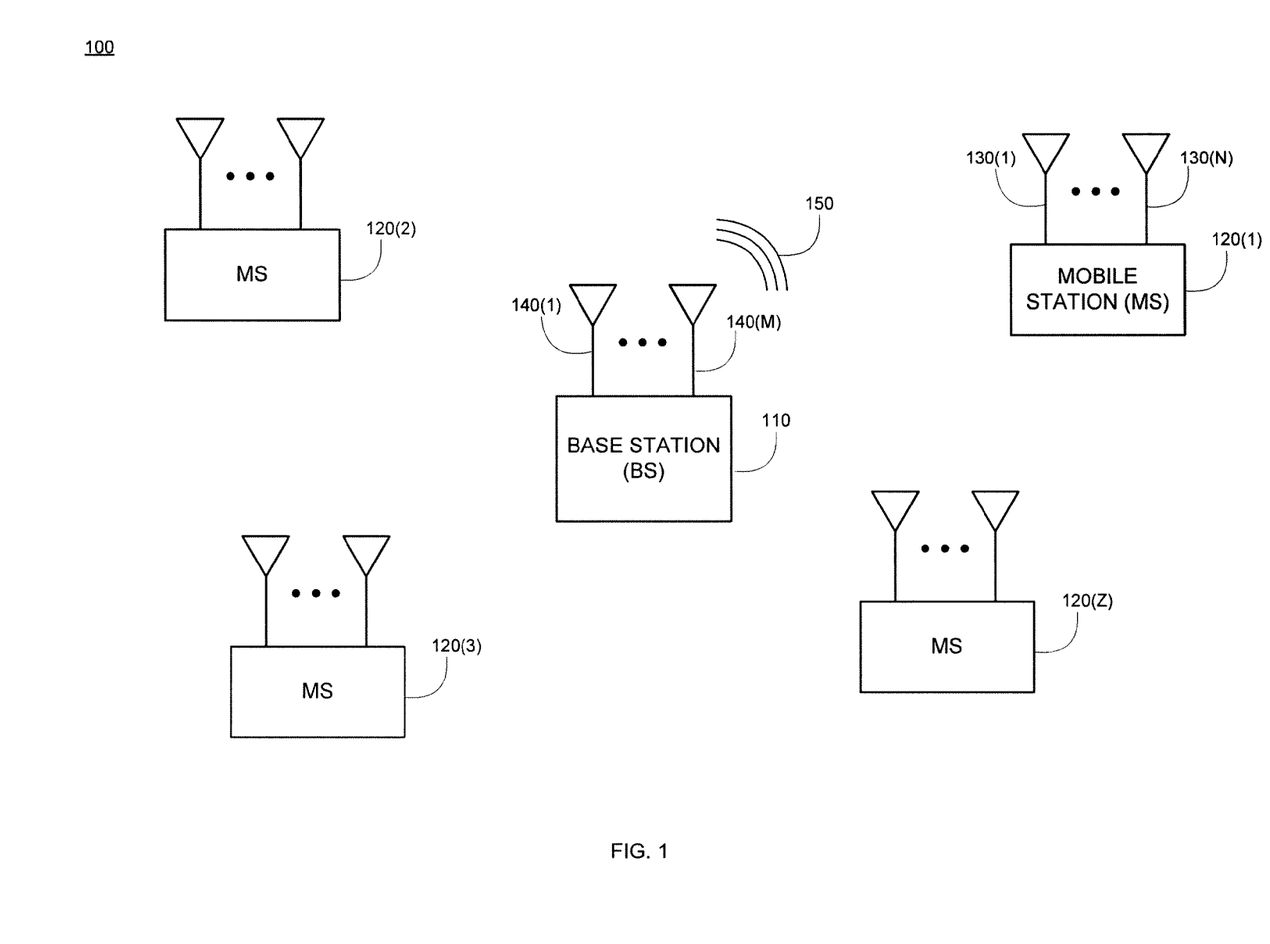
FIG. 1 is an example block diagram of a wireless communication system in which a BS communicates with mobile stations (MSs), also referred to herein as UEs, in which each mobile station employs a Radio Link Monitoring process according to the techniques described herein.

Referring first to FIG. 1, a wireless radio communication system or network is shown generally at reference numeral 100 and comprises a base station 110, or eNode B in LTE parlance, and a plurality of UEs or MSs 120(1)-120(Z). The BS 110 may connect to other wired data network facilities (not shown) and in that sense serves as a gateway or access point through which the MSs 120(1)-120(Z) have access to those data network facilities.

The BS 110 comprises a plurality of antennas 140(1)-140(M) and the MSs 120(1)-120(Z) may also comprise a plurality of antennas 130(1)-130(N). The BS 110 may wirelessly communicate with individual ones of the MSs 120(1)-120(Z) using a wideband wireless communication protocol in which the bandwidth is much larger than the coherent frequency bandwidth, e.g., using LTE.

In this example, the BS 110 transmits a combination of downlink control messages and reference signals 150. The downlink control messages are also referred to as Downlink Control Information (DCI) and are transmitted using PDCCHs. The techniques provided herein enable the MSs on a wireless communication link to monitor the signal quality of these messages received from the BS using an RLM process. For example, as depicted in FIG. 1, the BS 110 also transmits cell specific reference signal 150 to all the MSs 120(1)-120(Z). The MSs 120(1)-120(Z) monitor the signal quality of the reference signals they receive from the BS using the techniques described herein in order to estimate the reliability of the reception and decoding of the control messages.

Figure 2:
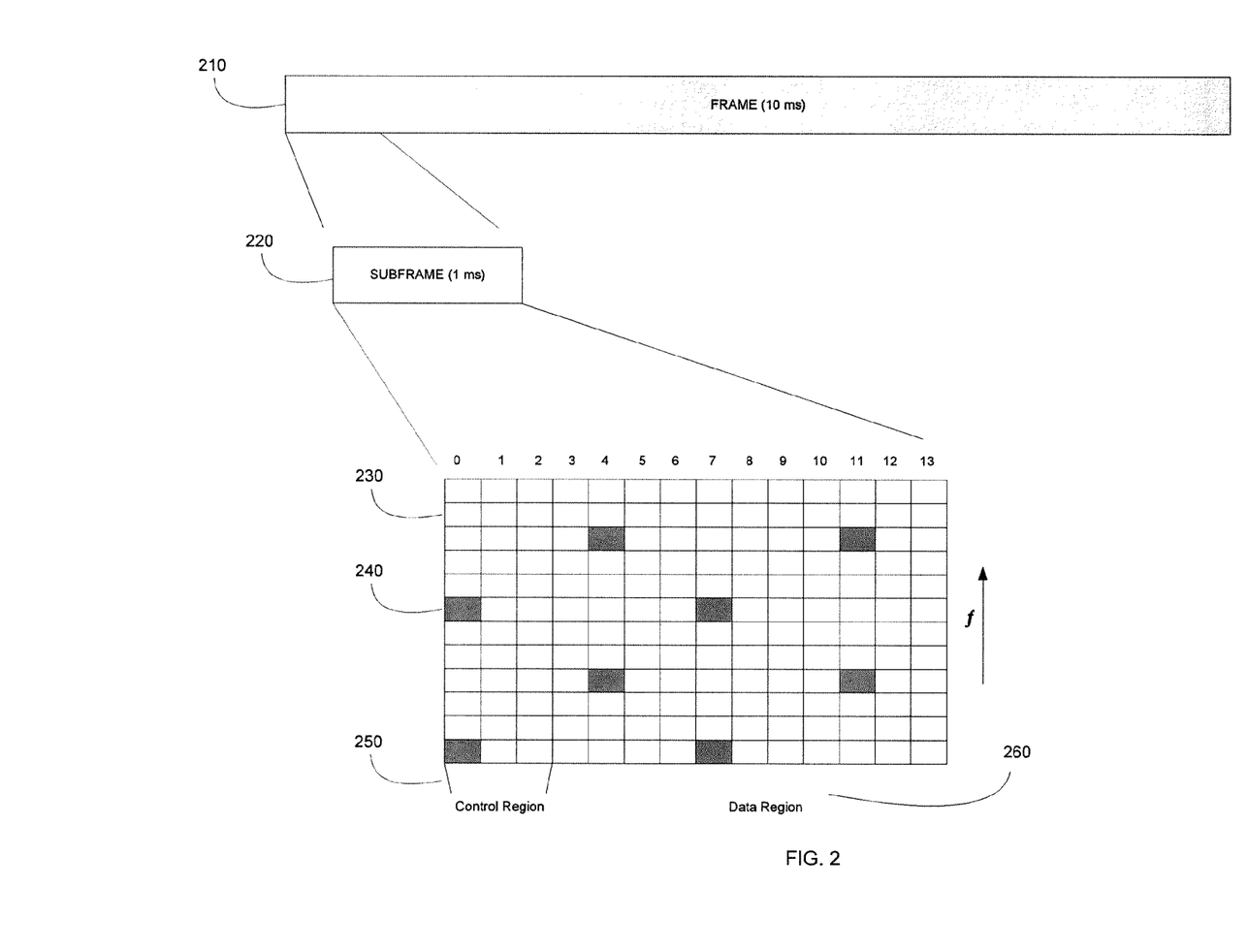
FIG. 2 is an example block diagram of an LTE downlink transmission frame structure depicting the selected resource element groups that form the cell specific reference signals.

Referring to FIG. 2, an example block diagram of an LTE downlink transmission frame structure is shown. FIG. 2 shows an LTE frame 210 that is 10 milliseconds (ms) in duration. The frame 210 comprises 10 subframes that are 1 ms in duration, of which subframe 220 is shown. Subframe 220 comprises either 12 or 14 OFDM symbols that are, for example, part of an Orthogonal Frequency Division Multiple Access (OFDMA) transmission scheme. OFDMA divides the allocated radio frequency (RF) spectrum into a number of orthogonal subcarriers. In this example, 14 symbols numbered zero to 13 are shown with radio frequency (RF) f for individual subcarriers increasing from the bottom of the symbols toward the top of the symbols. A resource element occupies a single subcarrier over one OFDM symbol. The symbols are divided into a control region 250 and a data region 260. The control region 250 may comprise the first one to four symbols, while the remainder of the symbols comprise the data region 260. In this example, the control region 250 comprises the first three symbols, numbered 0, 1, and 2.

In FIG. 2 the cell specific reference signals 240 are dispersed throughout the symbol space as shown by the shaded areas. The time and frequency location of these reference signals in the subframe is known to the UE a-priori. The set of modulation symbols used by the reference signals are also known by the UE. This makes it possible for the UE to estimate the propagation channels using these reference signals. The unshaded divisions 230 of the control area 250 contain the PDCCH control information.

Figure 3:
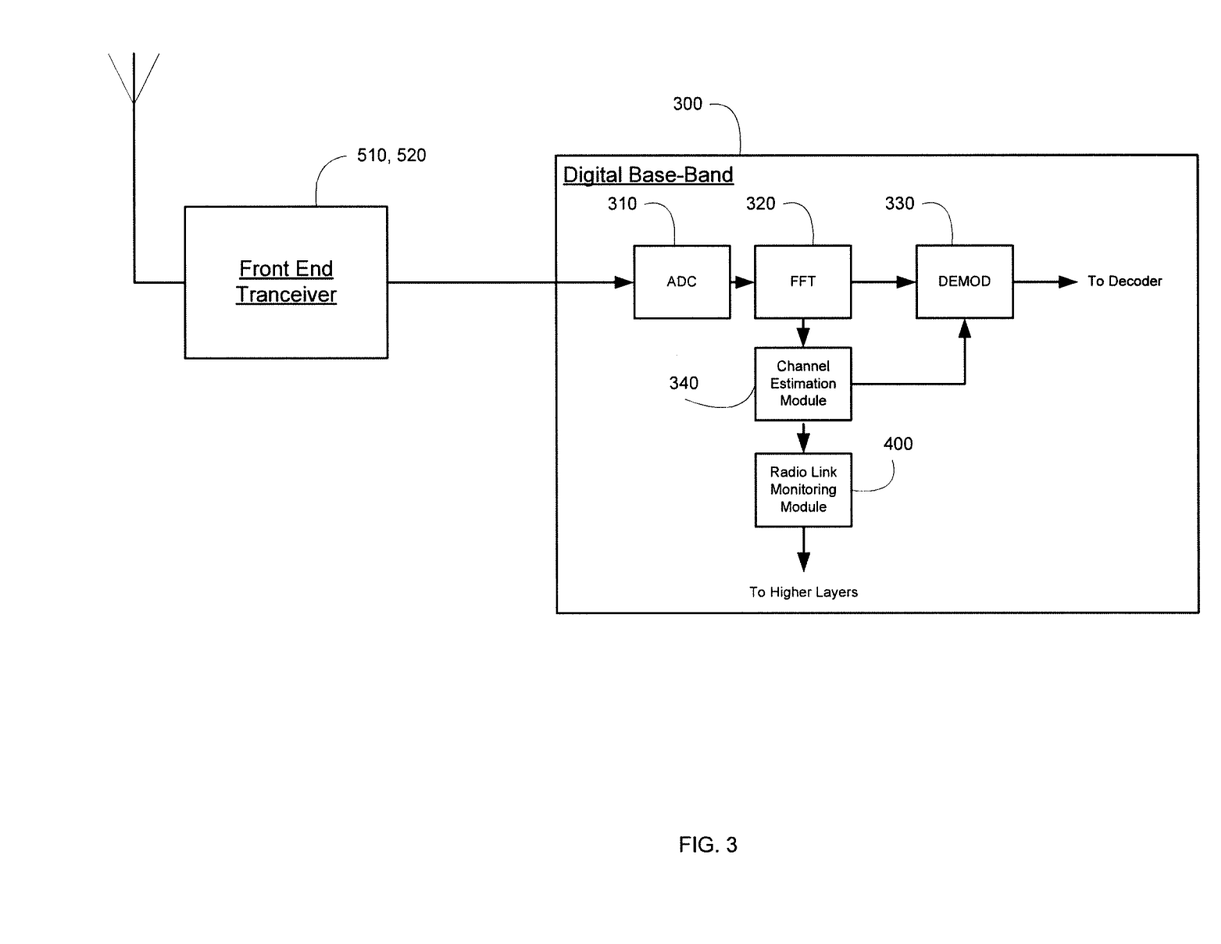
FIG. 3 is an example block diagram of the overall architecture of the components implementing the processes described herein.

Turning now to FIG. 3, an example block diagram is shown of the components of the received signal path. In this example the received signals output from the front end transceiver 510, 520 are input to the Digital Baseband 300 ADC 310 which converts the Orthogonal Frequency Division Multiplex (OFDM) channels into digital data streams, one for each sub-carrier. Further processing is performed by the Fast Fourier Transform (FFT) 320 and the demodulator 330.

The channel estimation module 340 uses the cell specific reference signal symbols to estimate the propagation channels corresponding to the multiple links between the different eNode-B and UE antennas. The estimation is performed by way of filtering and interpolation of the RS receive signal over the frequency and time domains (see FIG. 2) [P. Hoeher et al., "Two-dimensional pilot-symbol-aided channel estimation by wiener filtering", ICASSP, 1997] [O. Edfors et al., "OFDM channel estimation by singular value decomposition", IEEE Trans. On Communications]. In the case of a single transmit antenna at the eNode-B, i.e. when M is equal to 1, the channel estimation module 340$_{RE}$ generates channel estimates $(h_{l,r})_{r=0,\ldots,N-1,l=0,\ldots,N_{RE}-1}$ for the N UE receive antennas and the $N_{RE}$ resource element positions. The channel estimation also provides estimates of the noise power per receive antenna and per RE position $(\sigma_{v,r,l}^2)_{r=0,\ldots,N-1,l=0,\ldots,N_{RE}-1}$. The estimated channel samples are available for each of the subcarriers, with high resolution in time. However, for the purpose of Radio Link Monitoring not all channel samples are needed, therefore to save complexity only a limited subset of the samples are processed.

The purpose of RLM module and its method is to analyze the downlink radio link quality of the serving cell based on the cell specific RSs to determine whether the UE is in-sync or out-of-sync with the serving cell. The Radio Link Monitoring module 400 (see FIG. 4) performs the RLM process which calculates the two average SNR values over the complete/entire frequency bandwidth for the two hypothetical PDCCH formats (i.e., possible control message formats) corresponding to in-sync and out-of-sync conditions. The results of the calculations are then used to deduce the average error probabilities that are compared with the out-of-sync and in-sync thresholds to provide the in-sync/out-of-sync detection.

Figure 4:
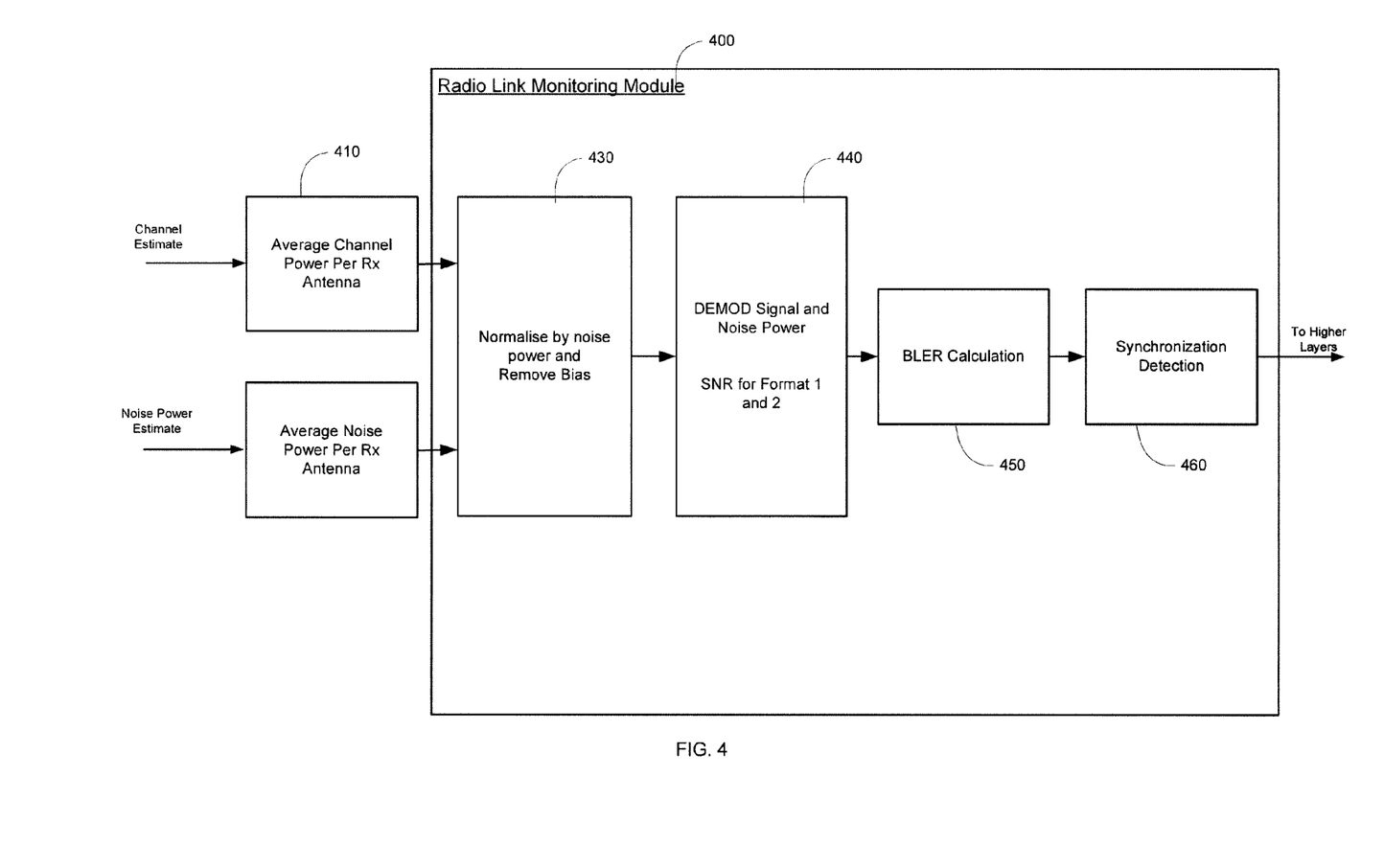
FIG. 4 is an example block diagram of the RLM components depicting the detection processing according to the techniques described herein.

Referring to FIG. 4, an example block diagram is shown of the components of the radio link monitoring module 400. In the case of a single eNode-B transmit antenna, the average channel power per receive antenna is calculated from the post FFT channel estimate at 410. The channel estimates $h_{l,r}$ are based on the RS symbols, however each of the two DCI transport formats (control message formats) has a different PDCCH to RS power ratio. These two power ratios are taken into account in the average SNRs. The channel power is averaged over the entire bandwidth and summed separately per receive antenna. The average channel power per receive antenna is expressed as:

$$P_{h_r} = \frac{1}{N_c} \sum_{l=1}^{N_c} |\tilde{h}_{l,r}|^2 \qquad \text{Equation 1}$$

$N_c$ denotes the number of channels estimate samples used for radio link monitoring. The channel estimation samples $\tilde{h}_{l,r}$ used in the calculation of the average channel power are selected from the set of channel estimates $h_{l,r}$ so as to essentially cover the entire bandwidth of the received signal. The selection of the channel samples used for RLM can be achieved by way of decimation of the channel samples available at the output of the channel estimation block. The decimation factor in this case can be made dependent on the bandwidth size and the number of transmit antennas. For example, the decimation factor could be adjusted in such a way that the total number of channel samples used for RLM is constant across different configurations such that a fixed complexity is achieved by the UE. The selection of the channel samples used for RLM can also be made dependant on the accuracy of the channel estimation process. The quality of the samples generated by the channel estimation module 340 usually depends on statistical characteristics of the propagation link, such as Doppler and delay spread. The amount of filtering, used both in the time and frequency domains, for the generation of the channel estimates will be set to match these channel parameters and hence the noise rejection achieved during the channel estimation will vary with these characteristics. In one embodiment of the invention, the number of channel estimation samples used for RLM is therefore determined according to these statistical characteristics of the propagation channel. In an alternative embodiment, the number of samples is derived directly from the value of the noise rejection achieved by the channel estimation process.

Some channel estimation techniques can lead to a poorer accuracy for the estimates corresponding to subcarriers at the edge of the received signal bandwidth. In LTE, the channel estimates located close to DC may also be less accurate as the DC subcarrier is not used for transmission by the base-station. It is possible to modify the above equation to take into account this variation in the quality of the different channel estimates. For example, the averaging process could be modified to ignore channel estimates corresponding to subcarriers close to the edge of the received signal bandwidth and/or close to the DC subcarrier. Alternatively, a weighted averaging could be used by using weights which are indicative of the quality of the channel estimates.

Referring back to FIG. 3, the average noise power per receive antenna is calculated from the post-FFT noise power estimate $(\sigma_{v,r,l}^2)$ in the channel estimation module 340; where r is the receive antenna index and l is the sample index. The per receive antenna noise power is used to scale the averaged channel power. In the case of a different noise power estimate per subcarrier or group of subcarriers, the noise power can be averaged over the entire bandwidth to improve the noise power estimate accuracy. The average noise power per receive antenna is expressed as:

$$\sigma_{v,r}^2 = \frac{1}{N_v} \sum_{l=1}^{N_v} \sigma_{v,r,l}^2 \qquad \text{Equation 2}$$

$N_v$ denotes the number of noise power estimate samples $\tilde{\sigma}_{v,r,l}^2$ selected for radio link monitoring from the original set of estimates $\sigma_{v,r,l}^2$ generated during the channel estimation. The techniques described above aimed to improving the quality of the channel power values by taking into the accuracy of the channel estimates can easily be extended to the noise power estimates.

In prior-art solutions, the channel estimate is assumed to have no multiplicative bias, i.e., the channel estimation has no impact on the scaling of the channel. If this is not the case, the multiplicative bias can be removed by scaling back the channel estimate power and the noise power. Furthermore, if the subcarriers at the edge of the band are processed differently, which may lead to a different multiplication bias, this bias can be removed as well in order to ensure best performance. In FIG. 4, at 430 the bias due to the additive estimate errors is removed from the average channel power by subtracting the noise power contribution per receive antenna. The noise rejection gain, which is the inverse of the channel estimation gain of the channel estimate used for RLM, is required to scale the noise power contribution.

Noise rejection depends on the amount of channel averaging in the time/frequency domain, and of the density of the reference signal symbols.

The bias is removed after the channel power is normalised by the noise power per receive antenna. The result is the unbiased normalised channel power estimate across the receive antennas which, for a single transmitter antenna, is expressed as:

$$\gamma = \left( \sum_{r=1}^{N_{rx}} \left( \frac{P_{h_r}}{\sigma_{v,r}^2} - \frac{1}{G_c} \right) \right)_+ \quad \text{Equation 3}$$

where $N_{rx}$ is the number of receive antennas, and $G_c$ is the channel estimation gain for channel samples used for radio link monitoring. The channel estimation gain $G_c^t$ is a measure of the noise reduction which is achieved by the channel estimation process. The + symbol means that negative values within the brackets should be treated as 0, while positive values remain unchanged.

It will be obvious to anyone skilled in the art that an unbiased normalised channel power estimate across the receive antennas could equally be achieved by first removing the bias from the channel power estimate and then scaling with respect to the noise power per receive antenna.

In the case of two transmitter antennas, the unbiased normalised channel power estimate across the receive antennas is expressed as:

$$\gamma = \left( \sum_{t=1}^{N_{tx}} \sum_{r=1}^{N_{rx}} \left( \frac{P_{h_{r,t}}}{\sigma_{v,r}^2} - \frac{1}{G_c^t} \right) \right)_+ \quad \text{Equation 4}$$

where $N_{tx}$ is the number of transmit antennas, $P_{h_{r,t}}$ is the power of the propagation channel between the transmit antenna t and the receive antenna r, and $G_c^t$ is the channel estimation gain for channel samples at transmit antenna t.

In the case of four transmitter antennas, due to the way the transmit antenna encoding is done differently for odd and even sub-carriers, we generate two unbiased normalised channel power estimates across the receive antennas, which is expressed as:

$$\gamma^{odd} = \left( \sum_{t=1,3} \sum_{r=1}^{N_{rx}} \left( \frac{P_{h_{r,t}}}{\sigma_{v,r}^2} - \frac{1}{G_c^t} \right) \right)_+ \quad \text{Equation 5}$$

$$\gamma^{even} = \left( \sum_{t=2,4} \sum_{r=1}^{N_{rx}} \left( \frac{P_{h_{r,t}}}{\sigma_{v,r}^2} - \frac{1}{G_c^t} \right) \right)_+$$

The solution for calculating the unbiased channel power estimate per receive antenna above is dependent on the transmit antenna modulation used by the LTE system. However the solution can be adapted for other systems using different space/time encoding.

To save power, the time averaging of the channel estimate used for RLM can be reduced from 1 subframe down to 1 slot or less in the case where no data transmission is scheduled to the UE. As a consequence there is less noise rejection and the channel bias to be removed is higher (scales inversely to the number of RS symbols used for channel estimation averaging in the time domain).

In radio link monitoring module 400, at 440 the impact of the noise estimation error is taken into account by calculating the overall noise power experienced by the demodulator, which is the contribution of the channel noise power plus the contribution of the channel estimate errors power.

The signal power and the overall noise power are calculated using formulas based on the analysis of the maximal-ratio combining (MRC) demodulator, taking into account the channel estimation errors. It will be obvious to the person skilled in the art as to how the techniques presented in this document can be extended to other demodulation approaches.

The noise power rejection of the channel estimate used for demodulation is required to calculate the overall noise power at the demodulator. This can be different from the channel estimate that is used for the RLM where the channel estimates can be of different quality, for example, if the channel estimates are generated at different times.

The signal power and the overall noise power calculation takes in account the different power scaling of the hypothetical PDCCH transport formats (possible control message formats) and, for a single transmit antenna, is expressed as:

$$P_s^x = \gamma^2 \mu \quad \text{Equation 6}$$

$$P_n^x = \gamma + \frac{1}{G}(\gamma\mu + N_{rx})$$

where $P_s^x$ is the signal power at the output of the demodulator, $P_n^x$ is the noise power at the output of the demodulator, $\mu$ is the RS to PDCCH power scaling, and G is the channel estimate gain for channel samples used for the PDCCH demodulation.

In the case of two transmit antennas, the signal power and overall noise power calculation is expressed as:

$$P_s^x = \gamma^2 \mu \quad \text{Equation 7}$$

$$P_n^x = \gamma + \left(\frac{1}{G_1} + \frac{1}{G_2}\right)(\gamma\mu + N_{rx})$$

$G_1$ and $G_2$ are the channel estimation gains for transmitter antennas 1 and 2 respectively.

In the case of four transmit antennas, the signal power and overall noise power calculation is expressed as:

$$P_s^{x,odd} = \gamma^{odd2} \mu \quad \text{Equation 8}$$

$$P_n^{x,odd} = \gamma^{odd} + \left(\frac{1}{G_1} + \frac{1}{G_3}\right)(\gamma^{odd}\mu + N_{rx})$$

$$P_s^{x,even} = \gamma^{even2} \mu \quad \text{Equation 9}$$

$$P_n^{x,even} = \gamma^{even} + \left(\frac{1}{G_2} + \frac{1}{G_4}\right)(\gamma^{even}\mu + N_{rx})$$

$G_1$, $G_2$, $G_3$ and $G_4$ are the channel estimation gains for transmitter antennas 1, 2, 3 and 4 respectively. $P_s^{x,even}$, $P_n^{x,even}$ correspond to the demodulation signal and noise powers of the PDCCH even indexed symbols and which are transmitted on the antennas 1 and 3. $P_s^{x,odd}$, $P_n^{x,odd}$ on the other hand correspond to the demodulation signal and noise powers of the PDCCH odd indexed symbols and which are transmitted on antennas 2 and 4.

The radio link monitoring module 400 further comprises a signal to noise ratio calculation unit, where at 440 two average SNRs are calculated for each of the hypothetical PDCCH transport formats defined for in-sync and out-of-sync detection later. The difference is the RS to PDCCH power scaling ($\mu$). The average SNR for DCI formats 1 and 2, which correspond to the two hypothetical PDCCH formats, and in the case of one or two transmit antennas, can be expressed as:

$$SNR^1 = \frac{P_s^1}{P_n^1}$$
$$SNR^2 = \frac{P_s^2}{P_n^2}$$

Equation 10

In the case of four transmit antennas, the average SNR for DCI formats 1 and 2 can be expressed as:

$$SNR^1 = \frac{P_s^{1,odd} + P_s^{1,even}}{P_n^{1,odd} + P_n^{1,even}}$$
$$SNR^2 = \frac{P_s^{2,odd} + P_s^{2,even}}{P_n^{2,odd} + P_n^{2,even}}$$

Equation 11

The final result is obtained by averaging the signal and noise power separately and then calculating the SNR as a ratio of the averages.

Alternatively the final result can be arrived at by using EESM or MMIB mapping to map the odd/even instances of the signal power over noise power ratio into a single SNR in the form:

$$SNR^1 = \mathrm{mapping}\left(\frac{P_s^{1,odd}}{P_n^{1,odd}}, \frac{P_s^{1,even}}{P_n^{1,even}}\right)$$
$$SNR^2 = \mathrm{mapping}\left(\frac{P_s^{2,odd}}{P_n^{2,odd}}, \frac{P_s^{2,even}}{P_n^{2,even}}\right)$$

Equation 12

The use of EESM or MMIB for mapping odd and even instances into a single SNR is, in this case, different to the prior art solution where the EESM/MMIB map the full bandwidth into a single SNR.

The estimated BLER, based on the BLER versus SNR characteristic for a demodulator with no channel estimation errors, is evaluated for each of the two hypothetical PDCCH transport formats. At 450, in the block error rate (BLER) calculation unit, the BLER is averaged over several measurement intervals as specified in 3GPP TS 36.133 Section 7.6. The average BLER calculation can be expressed as:

$$Qm_{out} = \frac{1}{N^{out}} \sum_{i=1}^{N^{out}} BLER^1(SNR_i(\sigma_1^2))$$
$$Qm_{in} = \frac{1}{N^{in}} \sum_{i=1}^{N^{in}} BLER^2(SNR_i(\sigma_2^2))$$

Equation 13 where $N^{in}$ and $N^{out}$ are the number of measurement instances used for in-sync and out-of-sync evaluation. The BLER versus SNR characteristic is the same for all transmit antenna settings but is different for different channel bandwidths.

At 460, in a synchronization detection unit, out-of-sync and in-sync detection are performed by comparing the averaged BLERs, for DCI formats 1 and 2, with optimised thresholds. The out-of-sync threshold and the in-sync threshold are designed to yield best operating performance for the network. The threshold used for the detection of out-of-sync should nominally be set such that an indication is raised when the BLER for the first format is larger than 10%. The threshold used for in-sync detection should nominally be set such that an indication is raised for conditions where the BLER for the second format is lower than 2%.

The thresholds may be adjusted according to the bandwidth of the received signal and possibly on the number of transmit antennas as well. Out-of-sync and in-sync detection can be expressed as:

$$Qm_{out} > \mathrm{Thrd}_{out}: \text{Out-of-Sync}$$

$$Qm_{in} < \mathrm{Thrd}_{in}: \text{In-Sync}$$

Equation 14

The in-sync and out-of-sync indications are passed to the higher layers as specified in 3GPP TS 36.133 Section 7.6.

Figure 5:
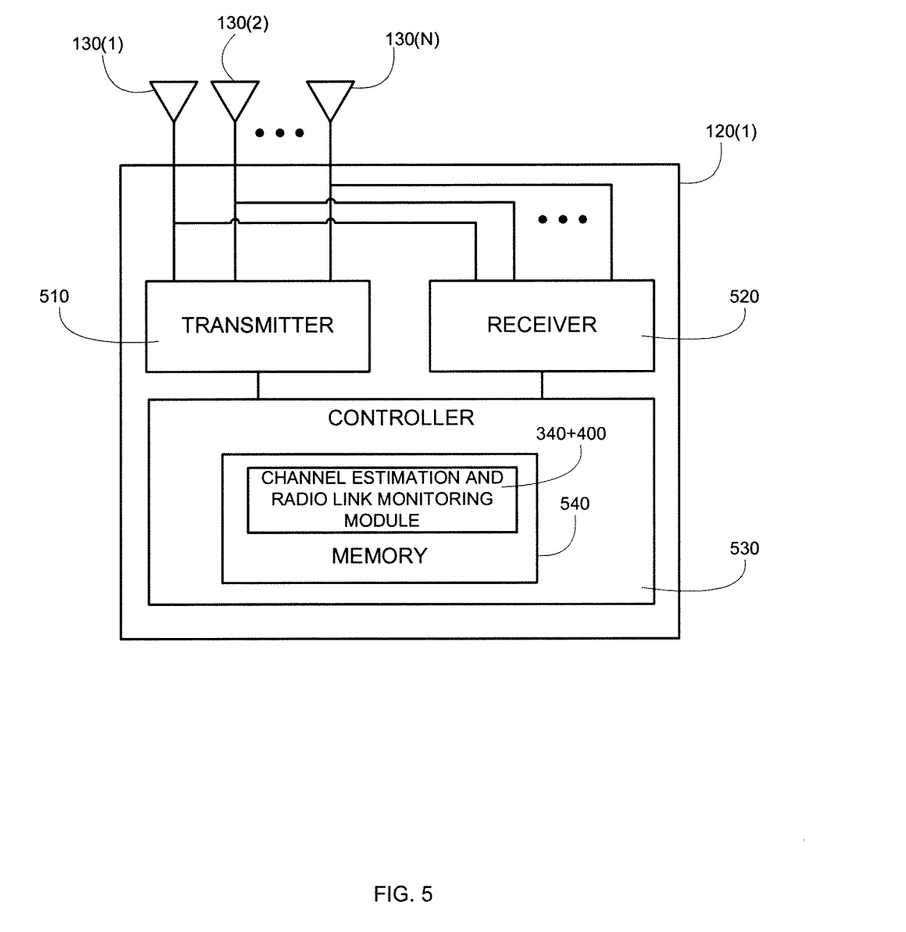
FIG. 5 is an example block diagram of a UE that implements the RLM process according to the techniques described herein.

Turning to FIG. 5, an example block diagram is shown of a wireless communication device that may serve as MS 120(1) from FIG. 1 for the purpose of describing the RLM process techniques described above. FIG. 5 depicts MS 120(1) as an example of a wireless communication device that is configured to perform the RLM process. The wireless communication device MS 120(1) comprises a transmitter 510, a receiver 520, and a controller 530. The controller 530 supplies the data to the transmitter 510 to be transmitted and processes signals received by the receiver 520. In addition, the controller 530 performs other transmit and receive control functionality. Part of the functions of the transmitter 510 and receiver 520 may be implemented in a modem and other parts of the transmitter 510 and receiver 520 may be implemented in radio transmitter and radio transceiver circuits. It should be understood that there are analog-to-digital converters (ADCs) and digital-to-analog converters (DACs) in the various signal paths to convert between analog and digital signals.

The transmitter 510 may comprise individual transmitter circuits that supply respective upconverted signals to corresponding ones of a plurality of antennas 130(1)-130(N) for transmission. The receiver 520 comprises a detector for detecting the signals received at each of the antennas 130(1)-130(N) and supplies corresponding detected data, e.g., LLR data, to the controller 530. It is understood that the receiver 520 may comprise a plurality of receiver circuits, each for a corresponding one of a plurality of antennas 130(1)-130(N). For simplicity, these individual receiver circuits are not shown. The controller 530 comprises a memory 540 or other data storage block that stores data used for the techniques described herein. The memory 540 may be separate or part of the controller 530. Instructions for performing channel estimation and the RLM process in the channel estimation module 340 and radio link monitoring module 400 may be stored in the memory 540 for execution by the controller 530.

The functions of the controller 530 may be implemented by logic encoded in one or more tangible (non-transitory) media (e.g., embedded logic such as an application specific integrated circuit, digital signal processor instructions, software that is executed by a processor, etc.), wherein the memory 540 stores data used for the computations described herein (and/or to store software or processor instructions that are executed to carry out the computations described herein). Thus, channel estimation module 340 and the RLM module 400 may be implemented with fixed logic or programmable logic (e.g., software/computer instructions executed by a processor).

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A user equipment, adapted to an Orthogonal Frequency Division Multiplex (OFDM) wireless communication system comprising a base station, the user equipment comprising:
    a receiver that receives from at least one antenna a plurality of signals over a set of OFDM symbols transmitted by the base station through a propagation channel, the OFDM symbols comprising a plurality of resource elements distributed in time and frequency, the resource elements comprising a plurality of control messages;
    a channel estimation module that generates a channel power value and a channel noise power value from the resource elements that are distributed essentially across an entire frequency bandwidth;
    a demodulator retrieving at least one of the control messages; and
    a radio link monitoring module, comprising:
    a signal to noise ratio (SNR) calculation unit that calculates a SNR at the output of the demodulator according to the channel and noise power values, wherein the SNR allows assessing of the quality of the control message which is from the base station,
    wherein the radio link monitoring module further generates an unbiased channel power by removing a channel estimation error bias from the channel power,
    wherein an unbiased normalized channel power is obtained by scaling the unbiased channel power value by the noise power value,
    wherein the radio link monitoring module calculates the channel estimation error bias by scaling the channel noise power value with a factor dependent on a noise rejection in the channel estimation of the resource elements associated with the channel power value and channel noise power value,
    wherein the channel power and the channel noise power values are calculated separately for the antenna and the channel power and the channel noise power values are combined to generate a SNR value at the output of the demodulator, and
    wherein the unbiased normalized channel power is represented as:

$$\gamma = \left( \sum_{r=1}^{N_{rx}} \left( \frac{P_{h_r}}{\sigma_{v,r}^2} - \frac{1}{G_c} \right) \right)_+$$

where $P_{h_r}$ represents the channel power value for each receiver antenna, $\sigma_{v,r}^2$ represents the noise power value for each receiver antenna, $N_{rx}$ is the number of receiver antennas, and $G_c$ the noise rejection in the channel estimation of the resource elements associated with the channel power and channel noise power.

2. The user equipment of claim 1, wherein the radio link monitoring module further generates a signal power value and signal noise power value from the unbiased normalized channel power, and the signal power value and signal noise power value are combined to generate the SNR at the output of the demodulator.

3. The user equipment of claim 2, wherein the signal noise power is calculated further dependent on a noise rejection in the channel estimation of the resource elements associated with the control messages.

4. The user equipment of claim 3, wherein the signal noise power for the control message is calculated further dependent on a number of receiver antennas.

5. The user equipment of claim 4, wherein the signal power and the signal noise power are calculated with a power scaling parameter that is dependent on possible formats of the control messages.

6. The user equipment of claim 2, wherein the radio link monitoring module further comprises:
    a block error rate (BLER) calculation unit, that estimates for possible control message formats, a BLER based on at least one SNR value, wherein the BLER is used to assess the quality of the control message.

7. The user equipment of claim 6, wherein the radio link monitoring module further comprises a synchronization detection unit that detects synchronization between the base station and the user equipment by comparing the BLERs of the possible control message formats with corresponding thresholds.

8. The user equipment of claim 7, wherein the thresholds are dependant on the frequency bandwidth of the signals transmitted by the base station.

9. A method for monitoring radio link quality, adapted to a given user equipment in an Orthogonal Frequency Division Multiplex (OFDM) wireless communication system comprising a base station, the method comprising:
    receiving a plurality of signals over a set of OFDM symbols transmitted through a propagation channel, the OFDM symbols comprising a plurality of resource elements distributed in time and frequency, the resource elements comprising a plurality of control messages;
    generating a channel power value and a channel noise power value from the resource elements that are distributed essentially across an entire frequency bandwidth;
    demodulating the signals to retrieve at least one of the control messages;
    combining the channel power value and the channel noise power value into a signal-to-noise ratio (SNR);
    assessing quality of one of the control messages which is from the base station using the SNR ratio;
    generating an unbiased channel power by removing a channel estimation error bias from the channel power, wherein the channel estimation error bias is calculated by scaling the channel noise power value with a factor dependent on a noise rejection in channel estimation of the resource elements associated with the channel power value and the channel noise power value; and
    generating an unbiased normalized channel power by scaling the unbiased channel power value by the noise power value,
    wherein the unbiased normalized channel power is represented as:

$$\gamma = \left( \sum_{r=1}^{N_{rx}} \left( \frac{P_{h_r}}{\sigma_{v,r}^2} - \frac{1}{G_c} \right) \right)_+$$

where $P_{h_r}$ represents the channel power value for each receiver antenna, $\sigma_{v,r}^2$ represents the noise power value for each receiver antenna, $N_{rx}$ is the number of receiver antennas, and $G_c$ the noise rejection in the channel estimation of the resource elements associated with the channel power and channel noise power.

10. The method of claim 9, further comprising:
calculating a signal power and a signal noise power using the unbiased normalized channel power; and
combining the signal power and the signal noise power to generate the SNR after demodulating.

11. The method of claim 10, wherein calculating a signal noise power comprises calculating the signal noise power further according to a noise rejection in the channel estimation of the resource elements associated with the control messages and according to a power scaling parameter that is dependent on possible control message formats.

12. The method of claim 11, further comprising:
estimating a block error rate (BLER) based on at least one SNR for each of the possible control message formats; and
detecting synchronization between the base station and the user equipment by comparing the BLERs with corresponding thresholds, the BLERs being respectively associated with the possible control message formats.

* * * * *